(12) United States Patent
Basak et al.

(10) Patent No.: US 12,744,392 B2
(45) Date of Patent: Sep. 22, 2026

(54) SYSTEM AND METHOD FOR OPERATING AN INVERTER-BASED RESOURCE IN GRID-FORMING MODE (GFM) FOR ENHANCED STABILITY

(71) Applicant: General Electric Renovables Espana, S.L., Barcelona (ES)

(72) Inventors: Rupam Basak, Howrah (IN); Arvind Kumar Tiwari, Niskayuna, NY (US); Veena Padmarao, Bengaluru (IN); Rabisankar Roy, Bengaluru (IN); Cornelius Edward Holliday, III, Forest, VA (US); Dustin F. Howard, Brookhaven, GA (US)

(73) Assignee: GE Vernova Renovables Espana, S.L., Barcelona (ES)

( * ) Notice: Subject to any disclaimer, the term of this patent is extended or adjusted under 35 U.S.C. 154(b) by 0 days.

(21) Appl. No.: 19/133,405

(22) PCT Filed: Nov. 30, 2022

(86) PCT No.: PCT/US2022/051348

§ 371 (c)(1),
(2) Date: May 28, 2025

(87) PCT Pub. No.: WO2024/118066

PCT Pub. Date: Jun. 6, 2024

(65) Prior Publication Data

US 2026/0196839 A1 Jul. 9, 2026

(51) Int. Cl.

*H02J 3/38* (2026.01)
*H02J 3/0014* (2026.01)

(Continued)

(52) U.S. Cl.

CPC .......... *H02J 3/381* (2013.01); *H02J 3/00142* (2026.01); *H02J 3/48* (2013.01); *H02J 2101/24* (2026.01);

(Continued)

(58) Field of Classification Search

CPC .......... H02J 3/381; H02J 3/00142; H02J 3/48; H02J 2101/24; H02J 2103/35; H02J 2101/28

(Continued)

(56) References Cited

U.S. PATENT DOCUMENTS 5,798,633 A 8/1998 Larsen et al.
7,119,452 B2 10/2006 Larsen (Continued)

FOREIGN PATENT DOCUMENTS

CN 107658904 A 2/2018
CN 109494709 A 3/2019

(Continued)

OTHER PUBLICATIONS

PCT International Search Report & Opinion PCTUS2022/051348 on Jun. 21, 2023.

(Continued)

*Primary Examiner* — Michael R. Fin
(74) *Attorney, Agent, or Firm* — Dority & Manning, P.A.

(57) ABSTRACT

A method for operating a renewable energy source having an inverter-based resource (IBR) system connected to a power grid includes: operating the IBR system as a virtual synchronous machine (VSM) in grid-forming mode (GFM) control; deriving a power error signal ($P_{ERR}$) between an actual real power output (Pfbk) from the IBR system and a power reference ($P_{ref}$); with an inertial power regulator, using the power error signal ($P_{ERR}$) to generate a power angle command signal received by a voltage regulator; with (Continued)

the voltage regulator, generating an x-direction current command (IRCmdx) signal and a y-direction current command (IRCmdy) signal that are both received by a current regulator; and generating and adding a delta x-direction current (ΔIRx) component to the (IRCmdx) signal.

16 Claims, 7 Drawing Sheets

(51) Int. Cl.
*H02J 3/48* (2026.01)
*H02J 101/24* (2026.01)
*H02J 101/28* (2026.01)
*H02J 103/35* (2026.01)

(52) U.S. Cl.
CPC ....... *H02J 2101/28* (2026.01); *H02J 2103/35* (2026.01)

(58) Field of Classification Search
USPC .......................................................... 307/24
See application file for complete search history.

(56) References Cited

U.S. PATENT DOCUMENTS

| | | | |
|---|---|---|---|
| 7,423,352 B2 | 9/2008 | Suryanarayanan et al. | |
| 7,518,344 B2 | 4/2009 | Sihler | |
| 7,804,184 B2 | 9/2010 | Yuan et al. | |
| 8,880,236 B2 | 11/2014 | Weiss et al. | |
| 9,270,194 B2 | 2/2016 | Brogan et al. | |
| 9,300,142 B2 | 3/2016 | Tarnowski | |
| 9,528,499 B2 | 12/2016 | Knuppel et al. | |
| 9,660,452 B2 | 5/2017 | Routimo | |
| 9,660,453 B2 | 5/2017 | Majumder | |
| 10,156,225 B2 | 12/2018 | Huang et al. | |
| 10,320,192 B2 | 6/2019 | Bamberger et al. | |
| 10,389,129 B2 | 8/2019 | Harnefors et al. | |
| 10,651,771 B2 | 5/2020 | Zhong | |
| 12,081,162 B2 | 9/2024 | Basak et al. | |
| 2009/0200803 A1 | 8/2009 | Ichinose et al. | |
| 2009/0278351 A1 | 11/2009 | Rivas et al. | |
| 2010/0142237 A1 | 6/2010 | Yuan et al. | |
| 2010/0256970 A1 | 10/2010 | Heese et al. | |
| 2014/0307488 A1 | 10/2014 | Brogan et al. | |
| 2014/0316604 A1 | 10/2014 | Ortjohann et al. | |
| 2018/0191281 A1 | 7/2018 | Zhong | |
| 2018/0269819 A1 | 9/2018 | Tuckey et al. | |
| 2019/0386593 A1 | 12/2019 | Zhong | |
| 2022/0190681 A1 | 6/2022 | Shine et al. | |
| 2022/0316443 A1 | 10/2022 | Zhang et al. | |
| 2022/0321041 A1 | 10/2022 | Ebrahimzadehveshareh et al. | |
| 2023/0327445 A1* | 10/2023 | Schön ....................... | H02J 3/18 323/207 |
| 2025/0062709 A1* | 2/2025 | Lund ....................... | H02J 3/381 |

FOREIGN PATENT DOCUMENTS

| | | |
|---|---|---|
| CN | 114744675 A | 7/2022 |
| EP | 2523298 B1 | 11/2012 |
| EP | 2792042 B1 | 2/2016 |
| EP | 3533996 A1 | 9/2019 |
| EP | 3971414 A1 | 3/2022 |
| WO | WO2014/032256 A1 | 3/2014 |
| WO | WO2015/131958 A1 | 9/2015 |
| WO | WO2017/069746 A1 | 4/2017 |
| WO | WO2019/149561 A1 | 8/2019 |
| WO | WO2020/043306 A1 | 3/2020 |
| WO | WO2020/052937 A1 | 3/2020 |
| WO | WO2020/135904 A1 | 7/2020 |
| WO | WO2020/135905 A1 | 7/2020 |
| WO | WO2020/221546 A1 | 11/2020 |
| WO | WO2021/129914 A1 | 7/2021 |
| WO | WO2021/145877 A1 | 7/2021 |
| WO | WO2021/170189 A1 | 9/2021 |
| WO | WO2022/028660 A1 | 2/2022 |

OTHER PUBLICATIONS

Arasteh et al., Fault Ride Through Capability of Grid Forming Wind Turbines: A Comparison of Three Control Schemes, XP006115486, IET Renewable Power Generation, vol. 16, No. 9, May 2022, 1866-1881.

Avazov et al., Damping of Torsional Vibrations in a Type-IV Wind Turbine Interfaced to a Grid-Forming Converter, TechRxiv Preprint, IEEE, 2021, 7 Pages. https://www.techrxiv.org/articles/preprint/Damping_of_Torsional_Vibrations_in_a_Type-IV_Wind_Turbine_Interfaced_to_a_Grid-Forming_Converter/14893161 https://doi.org/10.36227/techrxiv.14893161.v1.

Edrah et al., Effects of Pod Control on a DFIG Wind Turbine Structural System, XP011789177, IEEE Transactions on Energy Conversion, , vol. 35, No. 2, 2020, 765-774.

Fateh et al., Torsional Vibrations in the Drivetrain of DFIG- and PMG Based Wind Turbines: Comparison and Mitigation, DSCC2015-9953, Proceedings of the ASME 2015 Dynamic Systems and Control Conference, Columbus OH, Oct. 2015, 8 Pages. https://www.researchgate.net/publication/290434827_Torsional_Vibrations_in_the_Drivetrain_of_DFIG-_and_PMG-Based_Wind_Turbines_Comparison_and_Mitigation/link/56a2437708ae232fb201945b/download.

Huang et al., Synchronization and Frequency Regulation of DFIG-Based Wind Turbine Generators with Synchronized Control, IEEE Transactions on Energy Conversion, vol. 32, Issue 3, Sep. 2017, pp. 1251-1262. (Abstract Only).

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

Nian et al., Improved Virtual Synchronous Generator Control of DIFG to Ride-Through Symmetrical Voltage Fault, IEEE Transactions on Energy Conversion, vol. 35, Issue 2, Jun. 2020, pp. 672-683. (Abstract Only).

Wang et al., On Inertial Dynamics of Virtual-Synchronous-Controlled DFIG-Based Wind Turbines, IEEE Transactions on Energy Conversion, vol. 30, Issue 4, Dec. 2015, pp. 1691-1702. (Abstract Only).

Wang et al., Virtual Synchronous Control for Grid-Connected DFIG-Based Wind Turbines, IEEE Journal of Emerging and Selected Topics in Power Electronics, vol. 3, Issue 4, Dec. 2015, pp. 932-944. (Abstract Only).

Zhang, Virtual Shaft Control of DFIG-Based Wind Turbines for Power Oscillation Suppression, XP011920946, IEEE Transactions on Sustainable Energy, vol. 13, No. 4, 2022, 2316-2330.

* cited by examiner

SYSTEM AND METHOD FOR OPERATING AN INVERTER-BASED RESOURCE IN GRID-FORMING MODE (GFM) FOR ENHANCED STABILITY

RELATED APPLICATION

The present application claims priority to PCT Application No. PCT/US2022/051348, filed Nov. 30, 2022, which is incorporated by reference herein in its entirety.

FIELD

The present disclosure relates generally to operation of an inverter-based resource, such as a wind turbine generator, and more particularly, to systems and methods for operating a wind turbine generator as a virtual synchronous machine (VSM) in grid-forming mode (GFM).

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of wind power systems, penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

In addition, the reduction in the proportion of synchronous machines with respect to asynchronous machines, which determine the grid defining parameters voltage and frequency, have contributed to decreasing stability margins. The immediate consequence of the decreased stability margins is a grid collapse when subjected to voltage and frequency disturbances in the grid. To address this, many renewable resource machines, such as an inverter-based resource (IBR) configured as a doubly-fed induction generator in a wind turbine power system, operate in a "grid forming mode."

In "grid-forming mode" (GFM), the converters provide a voltage-source characteristic, where the angle and magnitude of the voltage are controlled to achieve the regulation functions needed by the grid. In GFM operation, the renewable resource is controlled to be operated as a virtual synchronous machine (VSM) having an inertial power regulator replicating synchronous machine behavior. Similar to an actual synchronous machine, this control exhibits an inertial response. Also, in GFM mode control, the predominant system variables of frequency and terminal voltage magnitude are regulated. With this structure, current will flow according to the demands of the grid while the converter contributes to establishing a voltage and frequency for the grid. This characteristic is comparable to conventional generators based on a turbine driving a synchronous machine.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Double-Feb Wind Turbine Generator."

To be effective, GFM inverter-based resources (IBRs) must be able to maintain an internal voltage phasor that does not move quickly when there are changes in grid conditions, e.g., sudden addition/removal of loads, opening or closing of grid connections that lead to phase jumps and/or rapid change of frequency. Such events include, for example, low voltage ride through (LVRT), high voltage ride through (HVRT), multiple fault ride through (MFRT), and phase jump events. In other words, the power from the grid-forming resource must be able to change suddenly to stabilize the grid, with a subsequent slow reset to power being commanded from a higher-level control function. In addition, the grid-forming resource must be able to rapidly enforce power limits that exist due to constraints on the power-handling portions of the device. Such a response is needed for severe disturbances on the grid, e.g., faults where power limits will be dynamically adjusted to coordinate with grid conditions for secure recovery from the fault. Further, the grid-forming resource should be able to rapidly follow changes in commands from higher-level controls, e.g., for damping mechanical vibrations in a wind turbine. Such requirements, however, can be difficult to achieve.

One consequence of GFM operation of conventional IBR's is that rapid changes in grid voltage magnitude, frequency, or angle may cause large deviations in active power from the intended operating point, potentially resulting in power overloads and/or oscillations. For this reason, it would be beneficial to have a modified grid-forming power regulation that enables faster control of power under certain conditions to avoid these overloads.

BRIEF DESCRIPTION

Aspects and advantages of the invention will be set forth in part in the following description, or may be obvious from the description, or may be learned through practice of the invention.

The present disclosure relates to a method and system for operating a renewable energy source having an inverter-based resource (IBR) system connected to a power grid during a transient power event on the power grid. The method includes: operating the IBR system as a virtual synchronous machine (VSM) in grid-forming mode (GFM) control; deriving a power error signal ($P_{ERR}$) between an actual real power output ($P_{fbk}$) from the IBR system and a power reference ($P_{ref}$) representing a desired power output of the IBR system; with an inertial power regulator, using the power error signal ($P_{ERR}$) to generate a power angle command signal received by a voltage regulator; with the voltage regulator, generating an x-direction current command (IRCmdx) signal and a y-direction current command (IRCmdy) signal that are both received by a current regulator; and generating and adding a delta x-direction current (ΔIRx) component to the (IRCmdx) signal, thereby providing an additional means of tuning the active power response.

In a particular embodiment, the renewable energy source is a wind turbine power system which may include a doubly-fed induction generator (DFIG).

In alternate embodiments, the renewable energy source may be a battery energy storage system (BESS), a solar power system, or a hydro power system.

The method and system will be described herein with reference to a wind turbine power system but, it should be appreciated that this is for explanation purposes only and that the method and system are not limited to wind turbine power systems.

The method and associated system may be implemented in response to different transient power events on the grid, which may include: a low voltage event, a high voltage event, a multi-fault event, a phase jump event, or a frequency shift event and is determined based on a detected grid characteristic exceeding a predefined value.

In particular embodiments, the delta x-direction current (AIRx) component is derived as a function the power error signal ($P_{ERR}$) input to the inertial power regulator.

The present disclosure also encompasses a renewable energy source connected to a power grid, wherein the renewable energy source includes: an inverter-base resource (IBR) system; a controller for controlling the IBR system, the controller including a processor configured to perform a plurality of operations. The plurality of operations includes: operating the IBR system as a virtual synchronous machine (VSM) in grid-forming mode (GFM) control; deriving a power error signal ($P_{ERR}$) between an actual real power output ($P_{fbk}$) from the IBR system and a power reference ($P_{ref}$) representing a desired power output of the IBR system; with an inertial power regulator, using the power error signal ($P_{ERR}$) to generate a power angle command signal received by a voltage regulator; with the voltage regulator, generating an x-direction current command (IRCmdx) signal and a y-direction current command (IRCmdy) signal that are both received by a current regulator; and generating and adding a delta x-direction current (AIRx) component to the (IRCmdx) signal, thereby providing an additional means of tuning the active power response.

The controller may be configured to perform or carry out any combination of the control functionalities discussed above and described in greater detail herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
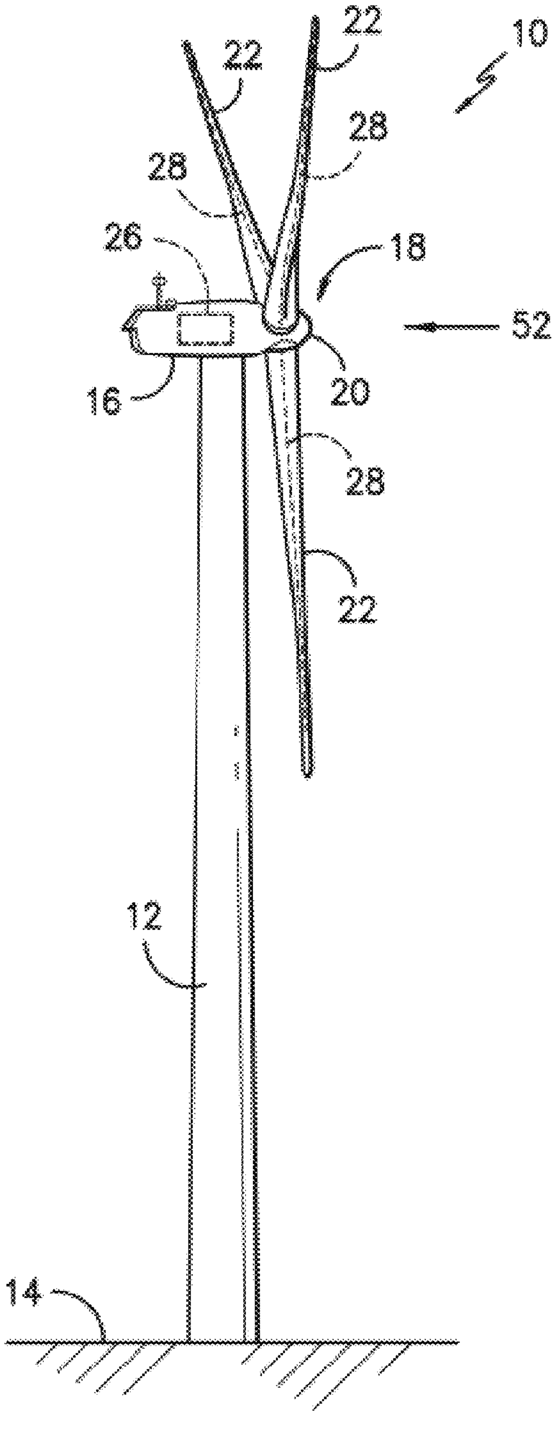
FIG. 1 illustrates a perspective view of one embodiment of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for controlling an inverter-based resource (IBR) connected to a power grid, wherein the IBR is operated in grid-forming mode (GFM) as a virtual synchronous machine (VSM). As used herein, inverter-based resources generally refer to electrical devices that can generate or absorb electric power through switching of power-electronic devices. Accordingly, inverter-based resource may include wind turbine generators, solar inverters, battery energy-storage systems, STATCOMs (static synchronous compensator), or hydro-power systems. For example, in one embodiment, the inverter-based resource may be a wind turbine power system having a rotor-side converter, a line-side converter, and a doubly-fed induction generator (DFIG) connected to the power grid.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 102 (FIG. 4) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
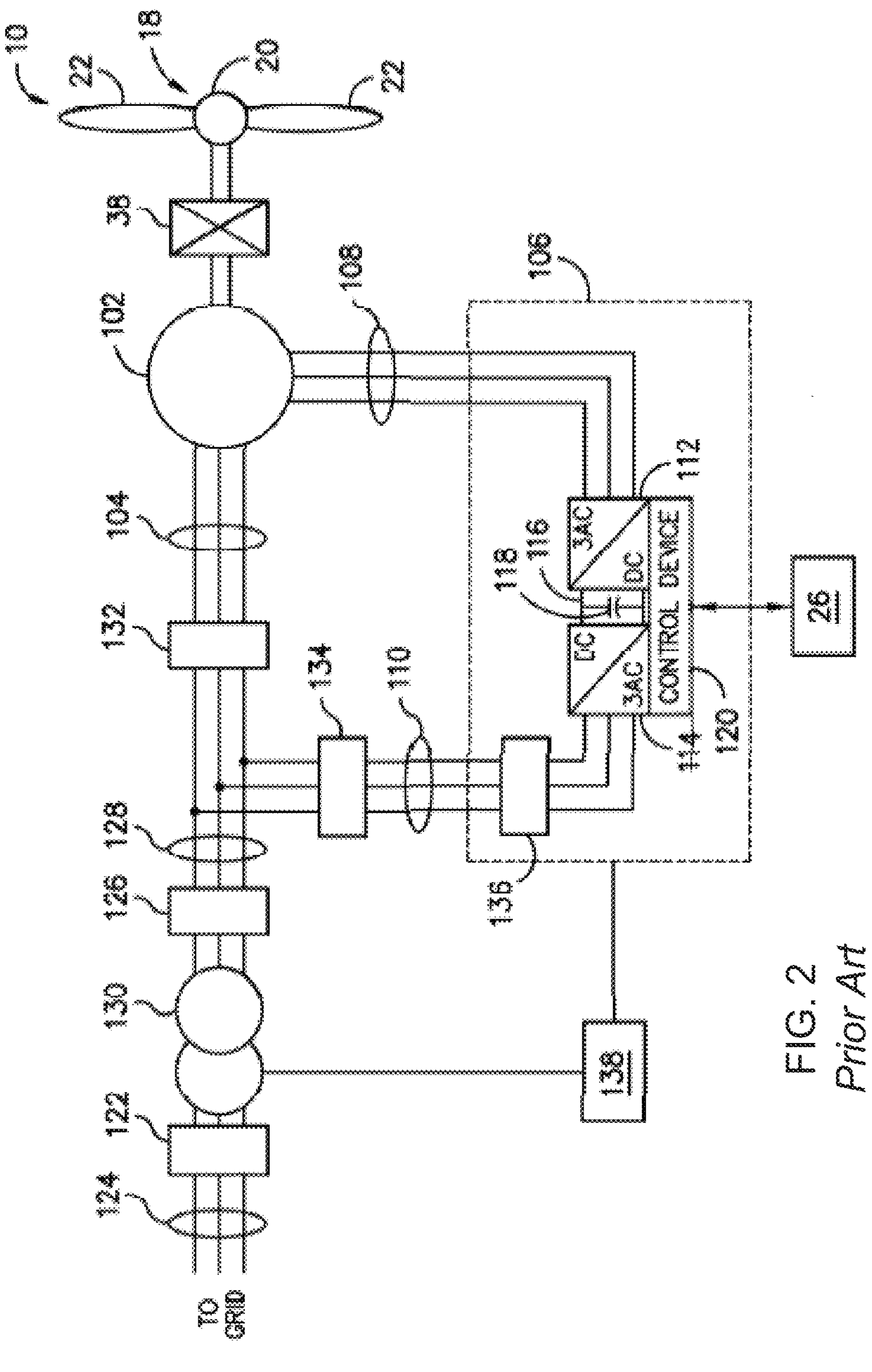
FIG. 2 illustrates a schematic view of an embodiment of a wind turbine electrical power system suitable for use with the wind turbine shown in FIG. 1.

Referring to the wind turbine power system 100 of FIG. 2, the rotor 18 of the wind turbine 10 may be coupled to the gearbox 38 via a high speed shaft (HSS), wherein the gearbox 38 is, in turn, coupled to the generator 102 via a low speed shaft (LSS). The generator 102 may be a doubly fed induction generator (DFIG). As shown, the DFIG 102 may be connected to a stator bus 104. Further, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side converter 112 converts the AC power provided from the rotor bus 108 into direct current (DC) power and provides the DC power to the DC link 116. As is generally understood, switching elements (e.g., IGBTs) used in the bridge circuits of the rotor side converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side converter 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from the converter controller 120 via the wind turbine controller 26. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled, and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling current and voltage.

Figure 3:
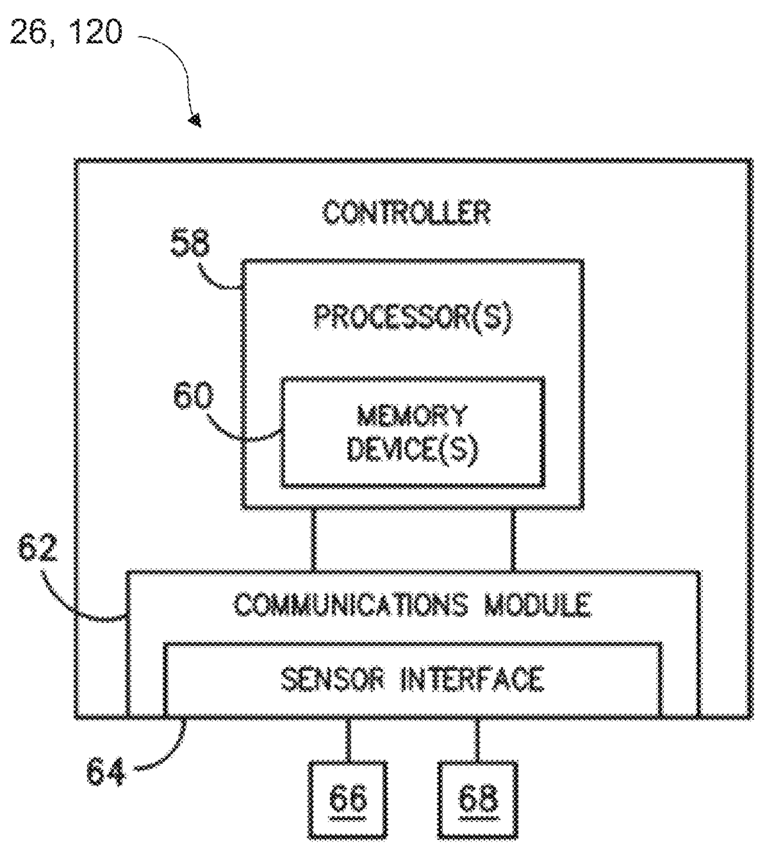
FIG. 3 illustrates a block diagram of one embodiment of a controller according to the present disclosure.

Referring now to FIG. 3, a block diagram of one embodiment of suitable components that may be included within the controller (such as any one of the converter controller 120, the turbine controller 26, and/or a farm-level controller) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 4:
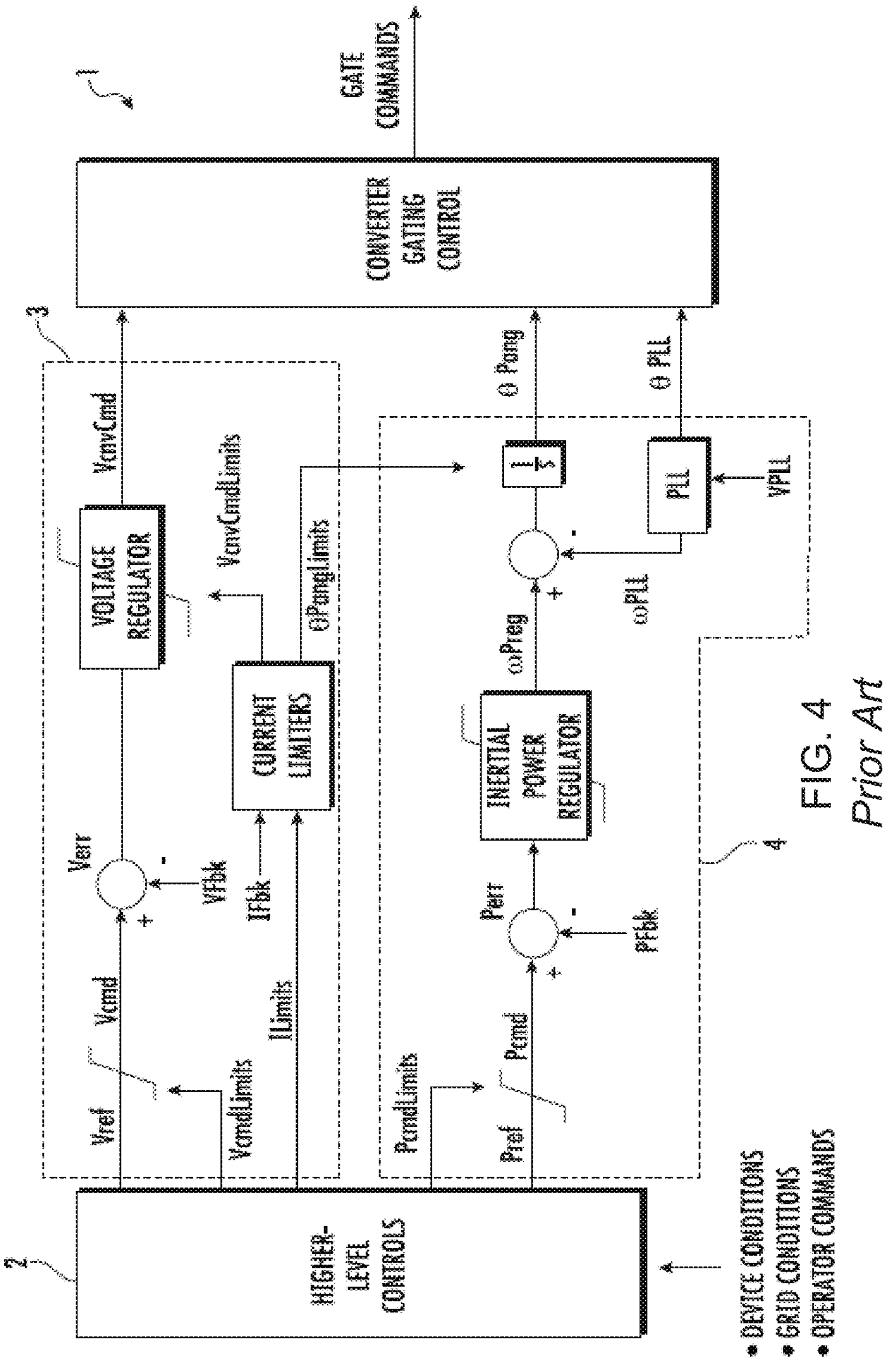
FIG. 4 illustrates a schematic diagram of an embodiment of a main circuit for grid-forming control of an asynchronous machine system according to conventional construction.

Referring now to FIG. 4, a control diagram for providing grid-forming mode (GFM) control to a renewable energy source operated as a virtual synchronous machine (VSM) according to conventional construction is illustrated. As shown, a converter controller 1 receives references (e.g., Vref and $P_{ref}$) and limits (e.g., $V_{cmdLimits}$ and $P_{cmdLimits}$) from higher-level controls 2. These high-level limits are on physical quantities of voltage, current, and power. The main regulators include a fast voltage regulator 3 and a slow power regulator 4, with the slow power regulator including an inertial power regulator that provides for VSM control of the machine. These regulators 3, 4 have final limits applied to the converter control commands for voltage magnitude (e.g., $V_{cnvCmd}$) and angle (e.g., $\theta_{Pang}$ and $\theta_{PLL}$) to implement constraints on reactive and real components of current, respectively. Further, such limits are based upon a predetermined fixed value as a default, with closed-loop control to reduce the limits should current exceed limits.

Figure 5:
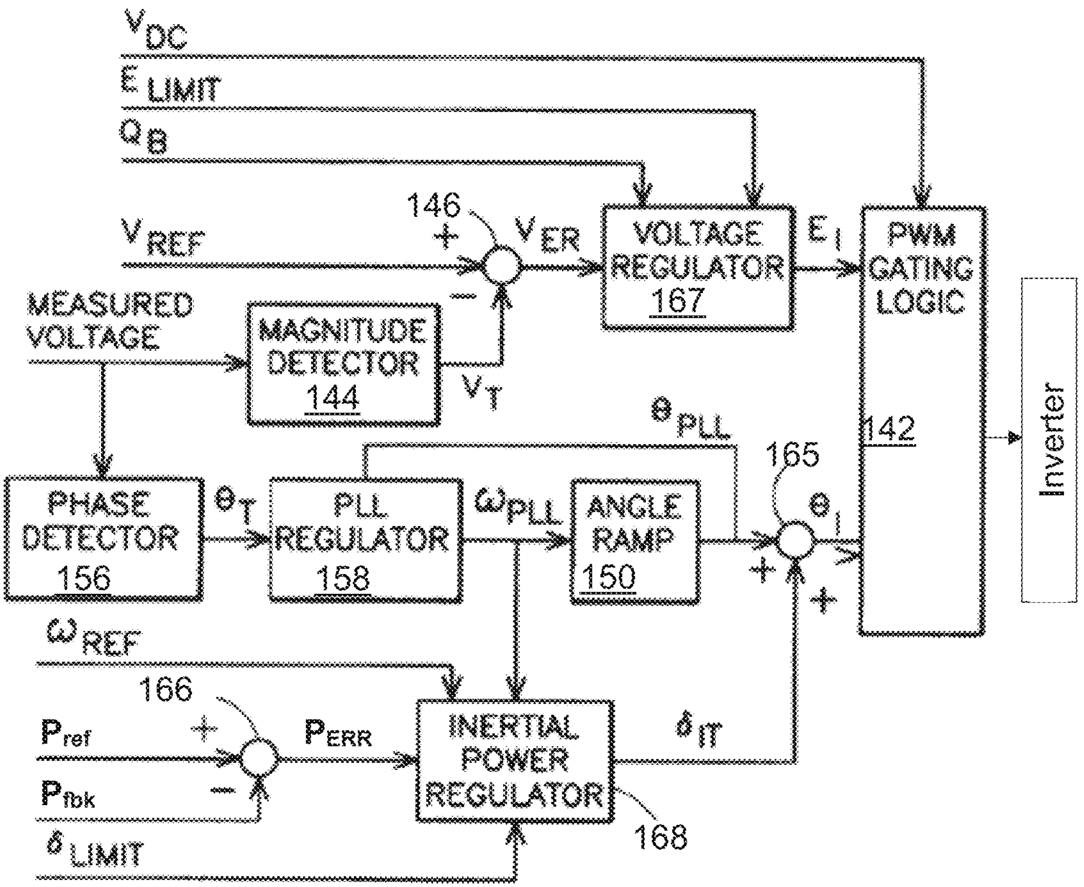
FIG. 5 is a control diagram for operation of an inverter-based resource having in grid-forming mode according to the present disclosure.

FIG. 5 illustrates a basic control for an IBR energy system that is connected to a utility system (e.g., a grid), wherein the inverter is controlled via gate pulses from the PWM gating logic 142. The basic control provides synchronizing functions to synchronize the inverter output waveform to the power utility waveform, both in phase and frequency. The synchronizing function is provided by detecting the phase of the measured voltage output from the power inverter in a phase detector 156. The output signal OT from phase detector 156 represents the phase of the voltage $V_T$, which is the voltage supplied by the utility. The phase signal is supplied to a phase lock loop (PLL) regulator 158 of a type well known in the art that generates a phase lock loop frequency output signal $\omega_{PLL}$. The signal $\omega_{PLL}$ is supplied to the angle ramp generator 150, which generates the phase lock loop feedback signal $\theta_{PLL}$ supplied as a feedback signal to the PLL regulator 158. The phase lock loop circuit including the PLL regulator and angle ramp generator 150 is a conventional type of phase regulator well known in the art and provides the synchronizing function to control the phase of the inverter terminal voltage E1. The signal OT from the phase detector 156 is the angle between the reference and the terminal bus voltage $V_T$. As long as the system is operating in steady state, the angle $\theta_T$ and the angle $\theta_{PLL}$ will be the same angle. Since the control of FIG. 5 is intended to be operated in conjunction with utility power, there is no separate independent frequency reference signal supplied to the phase lock loop.

The phase angle ("power angle") signal provides a means for controlling the amount of real power supplied by the power inverter. More particularly, the amount of reactive power versus the amount of real power coupled through the transformer to the grid can be adjusted by controlling the phase angle θ1. The phase shift signal ($\delta_{IT}$) generated by the inertial power regulator 168 is used to adjust the value of θ1 to vary this angle and thereby to control the amount of real power flowing through the transformer. The inertial power regulator 168 operates as an integrator on a power error signal PER and is also influenced by the signal $\omega_{PLL}$ supplied to the angle ramp generator 150. The phase shift signal ($\delta_{IT}$) is summed with the $\theta_{PLL}$ signal at the summer 165 to produce θ1. The power error signal $P_{ERR}$ is generated by the difference between an actual measured real power component $P_{fbk}$ and a power reference $P_{ref}$ developed at the summing junction 166, where the power reference signal $P_{ref}$ represents the desired power output of the inverter. A $\delta_{LIMIT}$ signal supplied to the inertial power regulator 164 controls the limits by which the value of (SIT) can be varied to control the angle between $V_T$ and E1.

Still referring to FIG. 5, the frequency reference signal $\omega_{REF}$ is provided to the inertial power regulator 168 along with the coupling of the signal $\omega_{PLL}$ from the phase lock loop. The signal $\omega_{REF}$ represents a desired frequency of the output voltage generated by the inverter and would typically be representative of a frequency of 60 Hz for U.S. use. The signal $\omega_{PLL}$ during stable operation represents the actual output voltage frequency.

Figure 6:
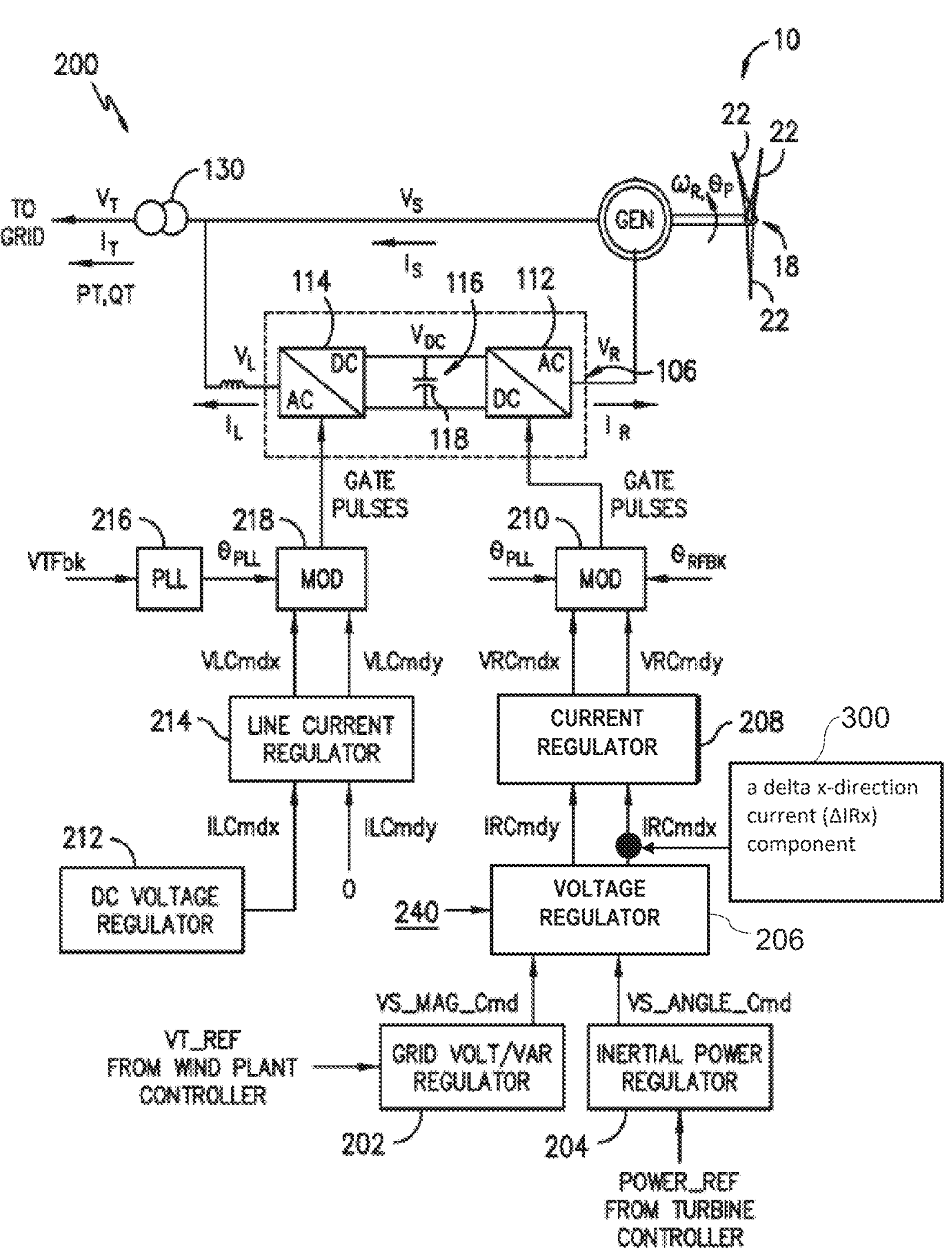
FIG. 6 is a control diagram for operation of an inverter-based resource having in grid-forming mode according to the present disclosure.

FIG. 6 depicts a schematic diagram of a system 200 and related method of operation for providing grid-forming mode (GFM) control of a doubly-fed induction generator (DFIG) of a wind turbine operating as a VSM according to the present disclosure. The system 200 may include many of the same features of FIGS. 4 and 5 discussed above. The line-side converter control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g. a phase-locked loop angle) from a phase-locked loop 216 to generate one or more gate pulses for the line-side converter 114. The phase-locked loop 216 typically generates its output using a voltage feedback signal.

The system 200 includes a control structure for controlling the rotor-side converter 112 using grid-forming characteristics. In particular, the system 200 may include a voltage regulator 206 for providing such grid-forming characteristics. In addition, as shown, the system 200 may include a grid voltage/VAR regulator 202, an inertial power regulator 204, a current regulator 208, and a modulator 210.

The voltage regulator 240 receives the terminal voltage magnitude command (VS_MAG_Cmd) signal from the grid volt/VAR regulator 202 and the terminal voltage phase angle command (VS_ANGLE_Cmd) from the inertial power regulator 204. The voltage regulator 240 generates the y-direction current command (IRCmdy) signal and the x-direction current command (IRCmdx) signal, which are received by the current regulator 208.

Still referring to FIG. 6, as discussed above, the voltage regulator 240, generates an x-direction current command (IRCmdx) signal and a y-direction current command (IRCmdy) signal, both of which are received by a current regulator 208. As depicted at 300, upon detection of the transient power event on the power grid, the present method and associated system configuration generate a delta x-direction current (ΔIRx) component and add this (ΔIRx) component to the (IRCmdx) signal to increase a margin of x-axis current used by the current regulator.

Figure 7:
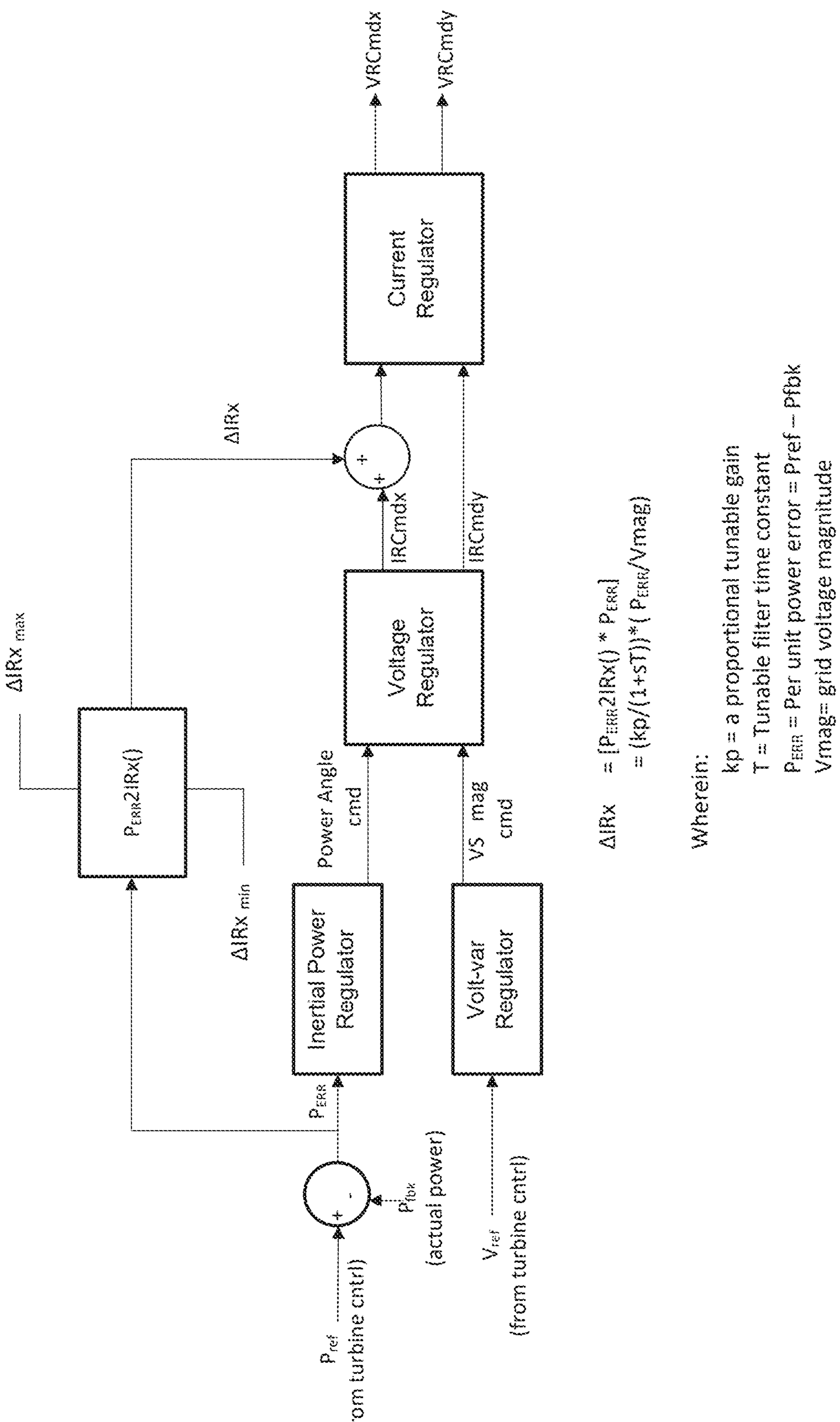
FIG. 7 is a control diagram depicting generation and application of a delta x-direction current (AIRx) component to the x-direction current command (IRCmdx) signal according to an embodiment of the present invention.

Referring to FIG. 7, the power error signal ($P_{ERR}$) is derived by the difference between an actual real power output ($P_{fbk}$) from the renewable energy source and a power reference ($P_{ref}$) representing the commanded power output of the renewable energy source. The inertial power regulator receives the power error signal ($P_{ERR}$) and generates the power angle command that is received by the voltage regulator. Aspects of this control functionality are explained above with respect to FIGS. 5 and 6, which may involve the inertial power regulator generating a phase shift angle ($\delta_{IT}$) from the power error signal ($P_{ERR}$) to provide the virtual synchronous machine (VSM) control functionality to the GFM control of the renewable energy source. The voltage regulator generates the x-direction current command (IRCmdx) signal and the y-direction current command (IRCmdy) signal that are both received by the current regulator.

Still referring to FIG. 7, the system (and control methodology) generates the delta x-direction current (ΔIRx) component and adds this value to the (IRCmdx) signal. As discussed above, the addition of the delta x-direction current (ΔIRx) component signal to (IRCmdx) signal provides an additional means for tuning the active power response to the renewable energy source.

As mentioned above, the method and related system improve wind turbine response during extreme grid events by damping power oscillations and reducing peak drivetrain loads, which in turn reduces the chance of slip or trip events and subsequent turbine unavailability. The present method and system also serve to minimize power oscillations that could create a significant power overshoot and undershoot under grid-forming control that could lead to a condition of non-compliance with grid code.

Still referring to FIG. 7, the delta x-direction current (ΔIRx) component is derived as a function the power error signal ($P_{ERR}$) input to the inertial power regulator. This function may be expressed as follows:

$$\Delta IRx = [P_{ERR} 2IRx() * P_{ERR}] = (kp/(1+sT)) * (P_{ERR}/Vmag)$$

Wherein:

kp=a proportional tunable gain

T=Tunable filter time constant $P_{ERR}$=Per unit power error=$P_{ref}$–$P_{fbk}$ Vmag=grid voltage magnitude This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A method for operating a renewable energy source having an inverter-based resource (IBR) system connected to a power grid, wherein the method allows for tuning an active power response of the renewable energy source, the method comprising: operating the IBR system as a virtual synchronous machine (VSM) in grid-forming mode (GFM) control; deriving a power error signal ($P_{ERR}$) between an actual real power output ($P_{fbk}$) from the IBR system and a power reference ($P_{ref}$) representing a desired power output of the IBR system; with an inertial power regulator, using the power error signal ($P_{ERR}$) to generate a power angle command signal received by a voltage regulator; with the voltage regulator, generating an x-direction current command (IRCmdx) signal and a y-direction current command (IRCmdy) signal that are both received by a current regulator; and generating and adding a delta x-direction current (ΔIRx) component to the (IRCmdx) signal, thereby providing an additional means of tuning the active power response.

Clause 2: The method according to clause 1, wherein the renewable energy source is a wind turbine power system.

Clause 3: The method according to one of clauses 1-2, wherein the IBR system includes a doubly-fed induction generator (DFIG).

Clause 4: The method according to one of clauses 1-3 wherein the renewable energy source is a battery energy storage system (BESS).

Clause 5: The method according to one of clauses 1-4 wherein the renewable energy source is a solar power system or a hydro power system.

Clause 6: The method according to one of clauses 1-5, wherein the method minimizes effects from transient power events on the power grid, the transient power events including are any one or combination of; a low voltage event, a high voltage event, a multi-fault event, a phase jump event, or a frequency shift event.

Clause 7: The method according to one of clauses 1-6, wherein the delta x-direction current (ΔIRx) component is derived as a function the power error signal ($P_{ERR}$) input to the inertial power regulator.

Clause 8: The method according to one of clauses 1-7, wherein the function is according to:

$$\Delta IRx = [P_{ERR} 2IRx() * P_{ERR}] = (kp/(1+sT)) * (P_{ERR}/Vmag)$$

Wherein:

kp=a proportional tunable gain

T=Tunable filter time constant $P_{ERR}$=Per unit power error=$P_{ref}$–$P_{fbk}$ Vmag=grid voltage magnitude Clause 9: The method according to one of clauses 1-8, wherein minimum and maximum limits are placed on ΔIRx, and wherein the limits and the kp proportional tunable gain are constant or are adjusted dynamically upon detection of transient power events on the grid.

Clause 10: A renewable energy source connected to a power grid, comprising: an inverter-base resource (IBR) system: a controller for controlling the IBR system, the controller comprising a processor configured to perform a plurality of operations, the plurality of operations comprising: operating the IBR system as a virtual synchronous machine (VSM) in grid-forming mode (GFM) control; deriving a power error signal ($P_{ERR}$) between an actual real power output ($P_{fbk}$) from the IBR system and a power reference ($P_{ref}$) representing a desired power output of the IBR system; with an inertial power regulator, using the power error signal ($P_{ERR}$) to generate a power angle command signal received by a voltage regulator; with the voltage regulator, generating an x-direction current command (IRCmdx) signal and a y-direction current command (IRCmdy) signal that are both received by a current regulator; and generating and adding a delta x-direction current (ΔIRx) component to the (IRCmdx) signal, thereby providing an additional means of tuning the active power response.

Clause 11: The renewable energy source according to clause 10, wherein the renewable energy source comprises a wind turbine power system, and wherein the IBR system comprises a doubly-fed induction generator (DFIG).

Clause 12: The renewable energy source according to one of clauses 10-11, wherein the renewable energy source comprises a battery energy storage system (BESS).

Clause 13. The renewable energy source according to one of clauses 10-12, wherein the renewable energy source comprises a solar power system or a hydro power system.

Clause 14: The renewable energy source according to one of clauses 10-13, wherein the plurality of operations comprises deriving the delta x-direction current (ΔIRx) component as a function the power error signal ($P_{ERR}$) input to the inertial power regulator.

Clause 15: The renewable energy source according to one of clauses 9-14, wherein the function is according to:

$$\Delta IRx = [PERR2IRx() * PERR] = (kp/(1+sT)) * (PERR/Vmag)$$

Wherein:

kp=a proportional tunable gain

T=Tunable filter time constant $P_{ERR}$=Per unit power error=$P_{ref}$–$P_{fbk}$ Vmag=grid voltage magnitude Clause 16: The renewable energy source according to one of clauses 10-15, wherein minimum and maximum limits are placed on ΔIRx, and wherein the limits and the kp proportional tunable gain are constant or are adjusted dynamically upon detection of transient power events on the grid.

What is claimed is:

1. A method for operating a renewable energy source having an inverter-based resource (IBR) system connected to a power grid, wherein the method allows for tuning an active power response of the renewable energy source, the method comprising:

operating the IBR system as a virtual synchronous machine (VSM) in grid-forming mode (GFM) control;

deriving a power error signal ($P_{ERR}$) between an actual real power output ($P_{fbk}$) from the IBR system and a power reference ($P_{ref}$) representing a desired power output of the IBR system;

with an inertial power regulator, using the power error signal ($P_{ERR}$) to generate a power angle command signal received by a voltage regulator;

with the voltage regulator, generating an x-direction current command (IRCmdx) signal and a y-direction current command (IRCmdy) signal that are both received by a current regulator; and generating and adding a delta x-direction current (ΔIRx) component to the (IRCmdx) signal, thereby providing an additional means of tuning the active power response.

2. The method according to claim 1, wherein the renewable energy source is a wind turbine power system.

3. The method according to claim 2, wherein the IBR system includes a doubly-fed induction generator (DFIG).

4. The method according to claim 1, wherein the renewable energy source is a battery energy storage system (BESS).

5. The method according to claim 1, wherein the renewable energy source is a solar power system or a hydro power system.

6. The method according to claim 1, wherein the method minimizes effects from transient power events on the power grid, the transient power events including are any one or combination of; a low voltage event, a high voltage event, a multi-fault event, a phase jump event, or a frequency shift event.

7. The method according to claim 1, wherein the delta x-direction current (ΔIRx) component is derived as a function the power error signal ($P_{ERR}$) input to the inertial power regulator.

8. The method according to claim 7, wherein the function is according to:

$$\Delta IRx = [P_{ERR} 2IRx() * P_{ERR}] = (kp/(1+sT)) * (P_{ERR}/Vmag)$$

Wherein:

kp=a proportional tunable gain

T=Tunable filter time constant $P_{ERR}$=Per unit power error=$P_{ref}$–$P_{fbk}$ Vmag=grid voltage magnitude.

9. The method according to claim 8, wherein minimum and maximum limits are placed on ΔIRx, and wherein the limits and the kp proportional tunable gain are constant or are adjusted dynamically upon detection of transient power events on the grid.

10. A renewable energy source connected to a power grid, comprising:

an inverter-base resource (IBR) system;

a controller for controlling the IBR system, the controller comprising a processor configured to perform a plurality of operations, the plurality of operations comprising:

operating the IBR system as a virtual synchronous machine (VSM) in grid-forming mode (GFM) control;

deriving a power error signal ($P_{ERR}$) between an actual real power output ($P_{fbk}$) from the IBR system and a power reference ($P_{ref}$) representing a desired power output of the IBR system;

with an inertial power regulator, using the power error signal ($P_{ERR}$) to generate a power angle command signal received by a voltage regulator;

with the voltage regulator, generating an x-direction current command (IRCmdx) signal and a y-direction current command (IRCmdy) signal that are both received by a current regulator; and generating and adding a delta x-direction current (ΔIRx) component to the (IRCmdx) signal, thereby providing an additional means of tuning the active power response.

11. The renewable energy source according to claim 10, wherein the renewable energy source comprises a wind turbine power system, and wherein the IBR system comprises a doubly-fed induction generator (DFIG).

12. The renewable energy source according to claim 10, wherein the renewable energy source comprises a battery energy storage system (BESS).

13. The renewable energy source according to claim 10, wherein the renewable energy source comprises a solar power system or a hydro power system.

14. The renewable energy source according to claim 10, wherein the plurality of operations comprises deriving the delta x-direction current (ΔIRx) component as a function the power error signal ($P_{ERR}$) input to the inertial power regulator.

15. The renewable energy source according to claim 14, wherein the function is according to:

$$\Delta IRx=[P_{ERR}2IRx()*P_{ERR}]=(kp/(1+sT))*(P_{ERR}/Vmag)$$

Wherein:

kp=a proportional tunable gain

T=Tunable filter time constant $P_{ERR}$=Per unit power error=$P_{ref}$−$P_{fbk}$ Vmag=grid voltage magnitude.

16. The renewable energy source according to claim 15, wherein minimum and maximum limits are placed on ΔIRx, and wherein the limits and the kp proportional tunable gain are constant or are adjusted dynamically upon detection of transient power events on the grid.

* * * * *